Aug. 19, 1947.  G. LAUBE ET AL  2,425,814
FILM MOVING MECHANISM
Filed Nov. 13, 1945  2 Sheets-Sheet 2
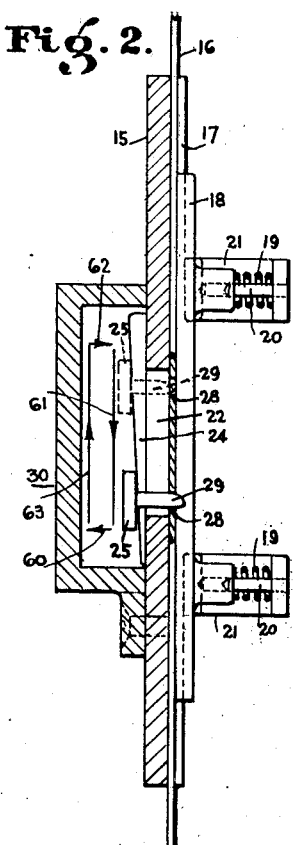
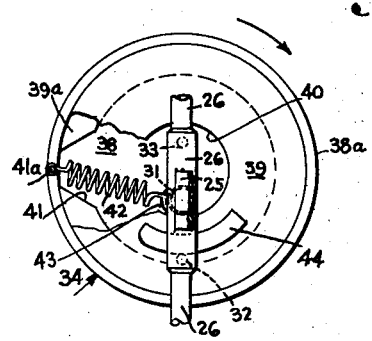
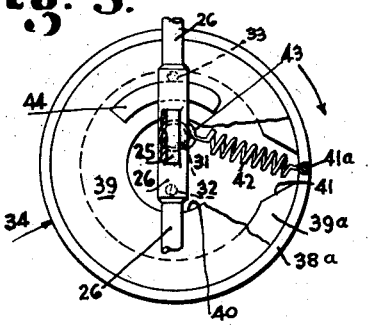
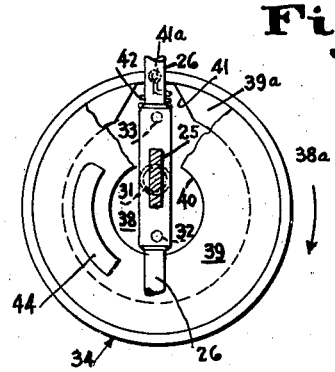
INVENTORS.
Grover Laube
Lawrence E. Belger Patented Aug. 19, 1947

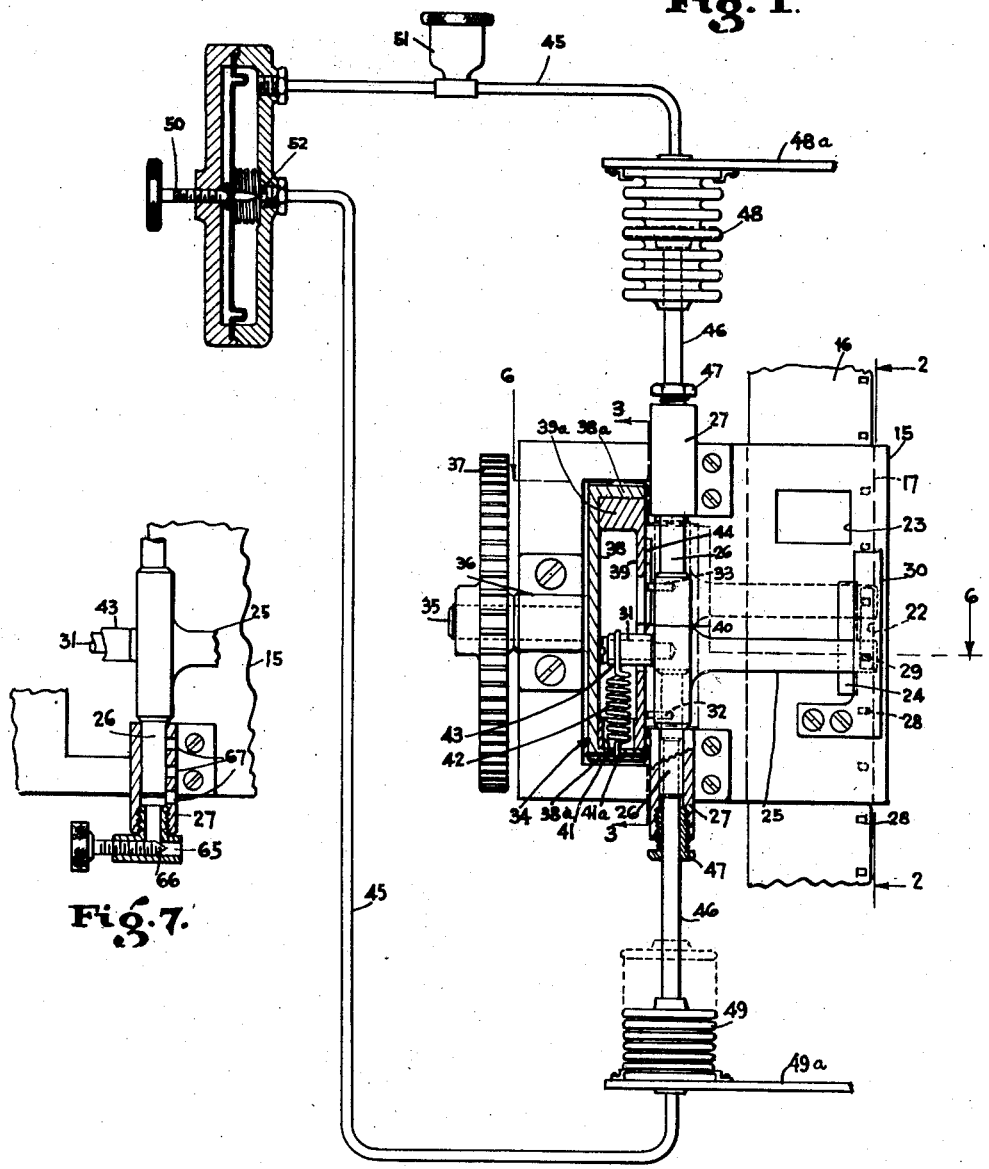

2,425,814

UNITED STATES PATENT OFFICE 2,425,814

FILM MOVING MECHANISM

Grover Laube, Los Angeles, and Lawrence E. Belger, Inglewood, Calif.

Application November 13, 1945, Serial No. 628,246

20 Claims. (Cl. 88—18.4)

1

This invention relates to apparatus for handling motion picture film and deals particularly with an intermittent film moving mechanism for use in projectors, cameras, film viewing machines, film advertising machines, micro-film reading machines, and the like.

It is generally understood that the main requirement for an intermittent film moving mechanism is to move the film cyclically step by step or frame by frame in the shortest time possible, thus allowing a maximum amount of time in each cycle for the film to dwell so that it may be viewed or light may be projected therethrough for the longest possible time. In the conventional film handling machines, the time required for moving the film from frame to frame in most cases requires nearly half of the cycle time, which in the case of projection permits only about one-half of the total light available to be transmitted through the film and reach the screen.

In the invention to be hereinafter described, the primary object is to provide an improved film moving mechanism that acts with extreme rapidity during the period of movement of the film, thus permitting a greatly increased dwell time for each frame of the picture.

Another object of our invention resides in the provision of a mechanism of the character described which may be run at lesser speeds than the conventional twenty-four frames per second and still retain the advantages of moving the film at substantially the same maximum speed of change-over from frame to frame as occurs at the conventional speed. This results in a decided advantage in viewing machines, advertising machines, or reading machines, because the change-over from frame to frame occurring so quickly is not obvious.

Another object of our invention is to accomplish this high speed change-over with a minimum of moving parts, thereby eliminating the usual gears and cams and providing for an action wherein a pin or pins is moved directly into the film at right angles to the film, effecting full engagement with the perforations therein, and is then moved downwardly or upwardly if found necessary or desirable to the next frame of picture and located at that particular frame with precision before the pin is withdrawn from the film.

2

It is another object of our invention to provide a means in the nature of a shock absorber to minimize the shock in a mechanism of the character described wherein the film is moved so rapidly. This may be accomplished by pneumatic or hydraulic means which are a part of this invention.

It is still another object of our invention to provide a definite action in connection with the pin members with respect to their path of movement in moving the film from frame to frame. Under the mechanism to be set forth herein, the path of the pin members is rectangular in form; that is, the pins move straight into the film, then straight down, and are moved out of the film at right angles to the film. Their return is also in a straight line. This provides an advantage in that the movement of the pins do not disturb the film during the dwell period.

These and other objects of our invention will become apparent as the description proceeds in conjunction with the accompanying drawings in which:

Figure 1 is an elevational view partly in section showing the inner relation of some of the concealed parts of the mechanism of our invention with hydraulic control means embodied therewith. In this view the film moving mechanism has just completed the takedown movement;

Figure 2 is an enlarged end view on line 2—2 of Figure 1 showing the means for guiding the film and illustrating by arrows the path taken by the film engaging pins, the pins being shown in solid lines in the position in which they are shown in Figure 1 and in broken lines at the beginning of the takedown movement;

Figure 3 is an elevation of the moving parts of our film moving mechanism taken on line 3—3 of Figure 1 with parts broken away to show a portion of the inner parts. This view is a quarter of a cycle later than the position shown in Figures 1 and 2;

Figure 4 is a view similar to Figure 3 with the parts advanced another quarter of a cycle, showing the position of the parts at the beginning of the takedown movement;

Figure 5 is another view similar to Figures 3 and 4 with the parts advanced still another quarter of a cycle. In this view the parts are set just preparatory to the takedown movement, which is the end of the cycle;

Figure 6 is a detailed view on the scale of Figure 1 taken on line 6—6 of Figure 1; and Figure 7 is a fragmentary view partly in section showing another form of shock absorber which may be used in our invention.

Briefly stated, our invention is based upon the concept that if energy is intermittently stored and released in a spring at predetermined intervals which correspond with the periodic time of change-over in a film moving mechanism, this force could be utilized to move the film in such mechanism with extreme rapidity and, if properly controlled by a predetermined release, the time of change-over required to move the film from frame to frame could be so controlled and reduced to such a small fraction of the cycle that the bulk of the time required for one cycle would be devoted to the dwell period of the film. In our invention we have shown one form of means for accomplishing this end. However, we are aware that other forms using a spring such as we have disclosed may be designed which will produce a similar action. For example, in the drawings and specification we have shown and described a tension spring but it is to be understood that a compression spring would work in place of a tension spring, the only change being that some of the operations would be in reverse order.

Considering now the drawings in detail and with particular reference to Figures 1 and 2, it will be seen that our invention comprises a carrier plate 15 adapted to be appropriately mounted within a projector, camera, or the like, so as to handle a perforated strip of film 16. The film slides in a guide channel 17 in one face of the plate 15, being held in the channel by a pressure plate 17 pressed against it by the compression springs 19 which are mounted and guided by pins 20 carried by brackets 21 mounted on the carrier plate. The plate 15 is provided with a slot 22 which connects the guide channel 17 with the other face of the plate, thus giving access to the film along the line of sprocket hole perforations 28. An exposure aperture 23 is also provided through the carrier plate in the guide channel 17, said aperture being aligned with the optical axis of the projector or camera, thus permitting a single guide channel and pressure plate to hold the film in position both for exposure and advancement. On the carrier plate 15 we mount a ridge 24 which runs parallel to the slot 22 and is of decreasing height in the direction in which the film is to be advanced. The purpose of this ridge will become apparent later. The foregoing arrangement provides the path which the film must follow in its movement through the apparatus.

The means for moving the film intermittently along the above mentioned path comprises an arm 25 mounted on a double ended shuttle piston 26 which is both rotatably and longitudinally slidable in cylinders 27 fastened to the carrier plate. The arm 25 may be fitted with one or more pins or projections 29 adapted to engage the perforations 28 of the film. In this instance we have shown one pin only. When the pin 29 is engaged in a sprocket hole 28 in the film 16, longitudinal movement of the shuttle piston 26 within the cylinders 27 will cause a like movement of the film. Since the shuttle piston 26 also rotates in the cylinders 27, thus permitting the arm 25 to rotate about the piston as an axis, a guide bar 30 is fastened to the carrier plate 15 over the outer end of the arm to limit the pivotal movement of the arm 25 to a small arc, but one which permits sufficient movement of the arm to withdraw the pin 29 from the film perforations. The shuttle piston also is provided with a stub shaft 31 in diametric opposition to the arm 25 and in addition carries restraining ring pins 32 and 33 in alignment with the shaft 31 spaced equally distant therefrom.

The flywheel and restraining ring assembly generally designated 34 is supported upon a shaft 35 journaled in a box 36 aligned with the stub shaft 31 when the same is at the center of its permitted shuttle and pivotal movements. The shaft 35 supports on its outer end a gear wheel 37 which may be connected to any suitable power transmission means for driving a projector or camera, the details of such device being known and forming no part of this invention.

The flywheel assembly 34 comprises a base plate 38 secured to the shaft 35 and a face plate 39, the two plates having annular flanges 38a and 39a respectively pressed telescopically together to form a hollow unit wherein the flanges provide enough mass to give the flywheel sufficient inertia and momentum to produce a smooth running mechanism. The face plate 39 has a central circular aperture through which the stub shaft 31 freely extends into the interior of the assembly. A recess 41 is formed in the flange 39a to pass one end of a tension spring 42 which is attached to the flange 38a in any suitable manner such as by a pin 41a, the other end of the spring being looped around a sleeve 43 rotatably mounted on the stub shaft 41. It is to be understood that the spring 42 is under tension at all times regardless of the position of the shuttle piston 26. It is also to be understood that a compression spring could be used in place of a tension spring with only slight modification of some of the parts.

The foregoing described flywheel assembly 44 is for the purpose of providing reciprocal motion to the shuttle piston 26. This is accomplished by rotating the flywheel through the gear 27 by any well known motive power. As the flywheel rotates, the anchor point 41a of the spring 42 moves in a circular path about the axis formed by the shaft 35. This will exert a rapidly changing force on the shuttle piston 26 which will be seen to be at its greatest when the direction of the force applied aligns with the direction in which the piston is free to move; that is, when the point 41a aligns with the top or bottom of the piston. In this position, the maximum amount of energy is stored in the spring and the piston would move in response to this force if it were not restrained. The means for restraining the piston until the proper time, at which it is instantly released and allowed to move freely in response to the force exerted by the spring, are a part of our invention. Under the above arrangement the same moving force is exerted upon the piston at the time of release and the speed of the piston is substantially the same regardless of the time interval between the releases.

The restraining means above mentioned includes a ridge 44 mounted on the plate 39 of such height as to make intermittent edge contact with the ring follower pins 32 and 33. The restraining ridge has an arc of approximately ninety degrees, whereby it will alternately make contact with pins 32 and 33 for approximately a quarter of a cycle each, and such contact periods will be separated by periods of no contact of approximately a quarter of a cycle each. It is to be understood that one complete revolution of the flywheel assembly 34 forms one cycle. The ridge 44 is placed sufficiently in arrear of the anchored end 41a of the spring 42 in the direction of the rotation of the restraining ring assembly to clear whichever of the pins it has been engaging after the spring has accumulated the optimum force for moving the shuttle piston 26 and to be in a position to engage the next pin before the pull of the spring is reversed in direction in a manner to be more fully explained hereinafter.

To cushion the shock and vibration produced by the sudden reciprocating movement of the shuttle piston 26, we have provided a hydraulic means illustrated in connection with Figure 1. Here it will be seen that a pipe system 45 is connected to the outer ends of metal bellows 48 and 49 which are suitably supported on members 48a and 49a respectively. The other side of each of the bellows is connected to an opposite end of the piston 26 through rods 46 which pass through packing nuts 47. A needle valve 50, preferably of the spring and diaphragm type illustrated, is provided for regulating the flow of fluid through the system and a cup 51 affords means for filling the system with oil, kerosene, or any other suitable fluid. It will be observed that the system is a sealed circuit but through the action of connecting rods 46 which follow the movement of the piston 26 the bellows 48 and 49 are alternately expanded and compressed, thus forcing the liquid to flow through the pipe line 45 and through the adjustable valve 52 in response to the movement of the piston. By adjusting the needle valve 52, the resistance to the flow may be varied to impede the movement of the shuttle piston 26. Through means of the above nature not only are vibrations and shock absorbed, but the speed of the shuttle action may be varied to any desired extent below full velocity.

In Figure 7 we have shown another form of a shock absorber that may be used to cushion the shuttle piston 26. Here we have fragmentarily illustrated the plate 15 with a shuttle piston 26 mounted in the cylinders 27 for reciprocal motion in the manner explained hereinbefore. The piston carries the arm 25 and the stub shaft 31 with the sleeve 43 all in the usual order. In place of the hydraulic shock absorber system previously described, we may use a pneumatic system such as shown in this view. It will be noted that the member 27 in this arrangement is treated as a cylinder for the rod 26 which acts as a piston therein. On the lower end of the cylinder we mount an escape port 65 controlled by a needle valve 66. This escape port allows the air trapped in the cylinder on the downward movement of the piston to escape. By adjusting the needle valve 66, the rate of escape may be controlled so as to properly cushion the piston at the end of its stroke. It is to be understood that the cushioning effect should be more effective at the end of the stroke and that it should allow the piston to complete its stroke in a minimum of time with a maximum of speed and still perform a cushioning action. In addition, ports 67 may be made in the wall of the cylinder 27 to act as bleeder outlets for the rapid escape of air at the beginning of the downward stroke. These same ports will also function as inlets for air on the return stroke of the piston. In this view we have shown but one arrangement. However, it is to be understood that a similar arrangement should be provided at the opposite end of the shuttle piston.

The method of operation of our invention may best be understood by consideration of Figures 1, 3, 4, and 5, which illustrate in that order a complete cycle of movement. As shown in Figure 1, a film 16 has been threaded in the guide channel 17 to be advanced downwardly and illustrates in this view the instant of the cycle diametrically opposed to that shown in Figure 4. Here it will be seen that the restraining ring assembly has rotated to the point where it has cleared the ring follower pin 33 and has allowed the spring 42 to pull the stub shaft 31 downward. In this position the spring is in alignment with the shuttle piston 26 and therefore on dead center with respect to applying a tilting movement of the stub shaft with a consequent movement to the arm 25. As the shuttle piston carrying the arm 25 has just completed its movement downwardly with the film, the pin 29 is still fully engaged with the perforations in the film. The restraining ridge 44, having released the shuttle 26 by moving out of engagement with the pin 33, would appear in the upper right hand sector of this view if seen from the viewpoint of Figure 4, providing the flywheel assembly moves clockwise.

With the clockwise turning of the drivewheel 37, the flywheel and the restraining ring assembly moves toward the position of Figure 3. As soon as the spring 42 moves away from its dead center position, it tilts the stub shaft 31 to the left, causing the arm 25 to lift up and bring the outer end of the arm against the guide plate 30 with the film advancing pin 29 completely withdrawn from the film as shown in dotted lines in Figure 6. This movement of the pin is shown and indicated in Figure 2 by the arrow 60. Shortly after the pin is withdrawn and before the spring 42 exerts any force tending to move the shuttle piston 26 upwardly, the restraining ridge 44 makes contact with the ring follower pin 32 and holds the shuttle against movement by the force to be later applied by the spring. As the flywheel continues to rotate clockwise, the tension in the spring increases and the direction of the force applied by the spring on the shuttle piston 26 is rapidly changing and approaching an upward position which is directly in alignment with the travel of the shuttle. Also, the force applied by the spring to the shaft 31 is still to the left, thus holding the arm 25 in an elevated position with the pin 29 out of a film engagement position. In this position the shuttle is ready to move upwardly to a point where it is in position for a takedown movement. This upward movement takes place with extreme rapidity and occurs when the restraining ridge 44 releases the shuttle by disengaging the pin 32. The position of the parts at this stage are shown in Figure 4 and this particular movement of the pin is indicated by arrow 63 in Figure 2.

The cycle of operation now passes through the stages illustrated in Figures 4 and 5, which are repetitions in reverse of the two stages just described. As the spring 42 passes the dead center position of Figure 4, it exerts a force to the right as shown in Figure 5 upon the stub shaft 31, thereby rotating the piston 26 in the journals 27 and lowering the arm 25 so that the film advancing pin 29 fits into a perforation of the film, this movement of the pin being indicated by arrow 62 of Figure 2. Before the spring 42 is able to exert any downward force on the shuttle 26 caused by continued rotation of the flywheel 34, the restraining ridge 44 engages the pin 33, holding the shuttle against any movement.

Shortly after passing the position illustrated in Figure 5, the restraining ridge 44 clears the pin 33 and the shuttle piston 26 and the arm 25 are moved downwardly as indicated by the arrow 63 of Figure 2, the engaged film thereby being moved one frame. This movement is indicated by arrow 61 in Figure 2 and completes one cycle.

Because of the tension of the spring 42, which is stored energy, and the sudden release by the restraining ridge 44, the movement of the shuttle piston, and consequently the take-down pin 29, is of a release and snap order and takes place in a small fraction of the whole cycle. The time element here may be controlled either by the hydraulic or pneumatic means shown or by some other means which is not illustrated herein and may be decreased to an almost irreducible part of the cycle. The suddenness of this movement naturally will cause a certain amount of shock and this shock may be cushioned either by the hydraulic or pneumatic means shown, or equivalent means. It should be noted that the pins entering the film prior to the time of moving the film to a new frame position are stopped short of full entry by the arm 25 contacting a guide ridge 24 and that, even though the pins have entered perforated holes a certain distance, there is no actual engagement or touching of the film due to the tapered ends of the pins. However, full engagement is effected toward and at the end of the takedown stroke by the arm 25 sliding down the inclined ridge 24 which forces the tapered part of the pin to slide through the perforations until a full fitting pin engagement is established, thus leaving the film frame accurately positioned before the pins are retracted from the film.

It will be understood that the embodiment of our invention disclosed herein is exemplary only and that various changes and modifications may be made by those skilled in the art without departing from the spirit and the scope of the appended claims.

We claim:

1. In a film moving mechanism, a rotatable member, a reciprocal member adjacent thereto, and a resilient member having one end suitably connected to said rotatable member eccentrically thereof and the other end connected to said reciprocal member to oscillate the same upon the rotation of said rotatable member.

2. In a film moving mechanism, a flywheel, a shuttle member adjacent said flywheel, and a resilient member having one end suitably connected to said flywheel eccentrically thereof and the other end connected to said shuttle to reciprocate the same upon rotation of said flywheel.

3. In a film moving mechanism, a rotatable member, a shuttle member reciprocally and rotatably mounted adjacent said rotatable member, a stud shaft mounted on said shuttle member intermediate the ends thereof, and a resilient member having one end connected to said rotatable member eccentrically thereof and the other end connected to said stub shaft to reciprocate and rotate said shuttle member in response to rotation of said rotatable member.

4. In a film moving mechanism, a rotatable member, a shuttle member reciprocally and rotatably mounted adjacent said rotatable member, a stub shaft on said shuttle member intermediate the ends thereof, an arm extending laterally from said shuttle member, a film engaging pin on said arm, and a resilient member having one end connected to said rotatable member eccentrically thereof and the other end connected to said shaft to reciprocate said shuttle member and said arm and to rotate said shuttle member to swing said arm and said pin into and out of a film engaging position.

5. In a film moving mechanism, a rotatable member, a shuttle member reciprocally and rotatably mounted adjacent said rotatable member, a stub shaft on said shuttle member intermediate the ends thereof, an arm extending laterally from said shuttle member, a film engaging pin on said arm, a resilient member having one end connected to said rotatable member eccentrically thereof and the other end connected to said shaft to reciprocate said shuttle member and said arm and to rotate said shuttle member to swing said arm and said pin into and out of a film engaging position, a restraining ring on said rotatable member and ring follower pins on said shuttle member adapted to engage said restraining ring and hold said shuttle member against reciprocal movement in response to force exerted by said resilient member, said ring and pins being arranged to release said shuttle member for movement at predetermined intervals.

6. In a film moving mechanism having a reciprocally and a rotatably mounted takedown member and a rotatable member therein, resilient means connecting said members arranged to reciprocate said takedown member in response to rotation of said rotatable member.

7. In a film moving mechanism having a reciprocally and a rotatably mounted takedown member and a rotatable member therein, resilient means connected to said members arranged to reciprocate and rotate said takedown member in response to rotation of said rotatable member, said resilient means including a spring arranged to intermittently store energy upon rotation of said rotatable member, and means adapted to restrain said takedown member against movement in response to said stored energy and release said takedown member in timed relation to the storing of energy in said spring.

8. In a film moving mechanism, a flywheel, a takedown member reciprocally mounted adjacent said flywheel, and a spring connecting an eccentric point on said flywheel to said takedown member to reciprocate the same upon rotation of said flywheel.

9. In a film moving mechanism, a flywheel, an elongated shuttle member mounted for longitudinal and rotatable movement adjacent said flywheel, and a spring connecting an eccentric point on said flywheel to said shuttle member to reciprocate and rotate the same in timed relation to the rotation of said flywheel.

10. In a film moving mechanism, a flywheel, an elongated shuttle member mounted for longitudinal and rotatable movement adjacent said flywheel, a stub shaft extending from said shuttle member substantially perpendicular thereto intermediate the ends thereof, and a spring having one end connected to said stub shaft and the other end connected to an eccentric point on said flywheel to reciprocate and rotate said shuttle member in timed relation to the rotation of said flywheel.

11. In a film moving mechanism, a flywheel, an elongated shuttle member mounted for longitudinal and rotatable movement adjacent said flywheel, an arm extending from said shuttle member, a film engaging pin on said arm, and a spring connecting an eccentric point on said flywheel to said shuttle member to reciprocate said shuttle with said arm and pin and swing the pin into and out of a film engaging position in response to rotation of said flywheel.

12. In a film moving mechanism, a flywheel, an elongated shuttle member mounted for longitudinal and rotatable movement adjacent said flywheel, an arm extending from said shuttle member, a film engaging pin on said arm, a spring connecting an eccentric point on said flywheel to said shuttle member to reciprocate said shuttle with said arm and pin and swing the pin into and out of a film engaging position in response to rotation of said flywheel, and a guard member over the outer end of said arm to limit the swing thereof.

13. In a film moving mechanism of the character described, a flywheel comprising a base plate having a peripheral flange and a drive shaft extending from the central portion of said plate, a cover plate having a peripheral flange adapted to be mounted on said first mentioned peripheral flange and form a rim for said flywheel with a cavity therein, there being a central opening in said cover plate leading to said cavity, a shuttle member mounted for reciprocal movement adjacent said flywheel, a stub shaft on said shuttle member extending through said opening into said cavity, and a spring in said cavity having one end connected to an eccentric point on said flywheel and the other end connected to said shaft to reciprocate said shuttle member upon rotation of said flywheel.

14. In a film moving mechanism, a carrier plate having a film guide channel therein and a photographic aperture in said plate through said channel, there being a slot through said plate whereby a film engaging pin may engage perforations in a film in said channel, means for intermittently moving said film in said channel, said means including a shuttle member having an arm thereon with a film engaging pin on said arm, a flywheel, and a resilient connection between said flywheel and said shuttle member adapted to reciprocate and rotate said shuttle member to reciprocate said arm and pin and swing said pin into and out of a film engaging position in response to rotation of said flywheel.

15. In a film moving mechanism of the character described, a flywheel comprising a base plate having a peripheral flange and a drive shaft extending from the central portion of said plate, a cover plate having a peripheral flange adapted to be mounted on said first mentioned peripheral flange and form a rim for said flywheel with a cavity therein, there being a central opening in said cover plate leading to said cavity, a shuttle member mounted for reciprocal movement adjacent said flywheel, a stub shaft on said shuttle member extending through said opening into said cavity, a spring in said cavity having one end connected to an eccentric point on said flywheel and the other end connected to said shaft to reciprocate said shuttle member upon rotation of said flywheel, and means for restraining the reciprocal movement of said shuttle and releasing the same at predetermined intervals with respect to the rotation of said flywheel.

16. In a film moving mechanism of the character described, a hollow flywheel comprising a base plate having a peripheral flange and a drive shaft extending from the central portion of said plate, a cover plate having a peripheral flange adapted to be mounted on said first mentioned peripheral flange and form a rim for said flywheel, there being a central opening in said cover plate leading to the cavity formed in said flywheel by said mentioned plates and flanges, a shuttle member mounted for reciprocal movement adjacent said flywheel, a stub shaft on said shuttle member extending through said opening into said cavity, a spring in said cavity having one end connected to an eccentric point on said flywheel and the other end connected to said shaft to reciprocate said shuttle member upon rotation of said flywheel, means for restraining the reciprocal movement of said shuttle and releasing the same at predetermined intervals with respect to the rotation of said flywheel, said last mentioned means including an arcuate restraining ring on the cover plate of said flywheel, and ring follower pins on said shuttle arranged to engage said restraining ring for predetermined intervals of rotation of said flywheel.

17. In a film moving mechanism, a rotatable member, a reciprocal member adjacent thereto, a resilient member having one end suitably connected to said rotatable member eccentrically thereof and the other end connected to said reciprocal member to oscillate the same upon the rotation of said rotatable member, and shock absorber means arranged to cushion said reciprocal member against shock in its oscillatory movement.

18. In a film moving mechanism, a rotatable member, a reciprocal member adjacent thereto, a resilient member having one end suitably connected to said rotatable member eccentrically thereof and the other end connected to said reciprocal member to oscillate the same upon the rotation of said rotatable member, and shock absorber means arranged to cushion said reciprocal member against shock in its oscillatory movement, said shock absorber means including a hydraulic system having a pipe line connected to a pair of bellows at opposite ends thereof, a controllable valve in said pipe line for regulating the resistance to flow of liquid through said pipe line, and means for connecting one of said pair of bellows to each end of said reciprocal member so that reciprocal motion of said member will cause one bellows to compress and the other to expand to force liquid to flow through said hydraulic system.

19. In a film moving mechanism, a rotatable member, a reciprocal member adjacent thereto, a resilient member having one end suitably connected to said rotatable member eccentrically thereof and the other end connected to said reciprocal member to oscillate the same upon the rotation of said rotatable member, and shock absorber means at the ends of said reciprocal member operable by reciprocal movement of said member to cushion same against shock from said reciprocal movement.

20. In a film moving mechanism, an elongated rotatable member, a reciprocal member adjacent thereto, a resilient member having one end suitably connected to said rotatable member eccentrically thereof and the other end connected to said reciprocal member to oscillate the same upon the rotation of said rotatable member, and shock absorber means at the ends of said reciprocal member operable by reciprocal movement of said member to cushion same against shock from said reciprocal movement, said shock absorber means including a cylinder at each end of said reciprocal member, a piston in each of said cylinders movable with said reciprocal member, said cylinders having ports operable to admit and discharge air from said cylinders in response to movement of said pistons and at least one of said ports in each cylinder having adjustable means for regulating the amount of air passing therethrough.

GROVER LAUBE.
LAWRENCE E. BELGER.

REFERENCES CITED

The following references are of record in the file of this patent:

UNITED STATES PATENTS

| Number | Name | Date |
|---|---|---|
| 1,680,659 | Bekesch | Aug. 14, 1928 |
| 2,361,291 | Howell | Oct. 24, 1944 |
| 2,346,070 | Fuller | Apr. 4, 1944 |

FOREIGN PATENTS

| Number | Country | Date |
|---|---|---|
| 325,127 | Great Britain | Feb. 13, 1930 |
| 611,526 | Germany | Mar. 29, 1935 |
| 338,454 | Germany | Jan. 14, 1924 |